May 18, 1954  F. A. KRUSE  2,678,744
WHEELED LIFTER FOR BEEHIVE FRAME SECTIONS
Filed Aug. 10, 1951  3 Sheets-Sheet 1

INVENTOR.
Frode A. Kruse
BY
Williamson & Williamson
ATTORNEYS

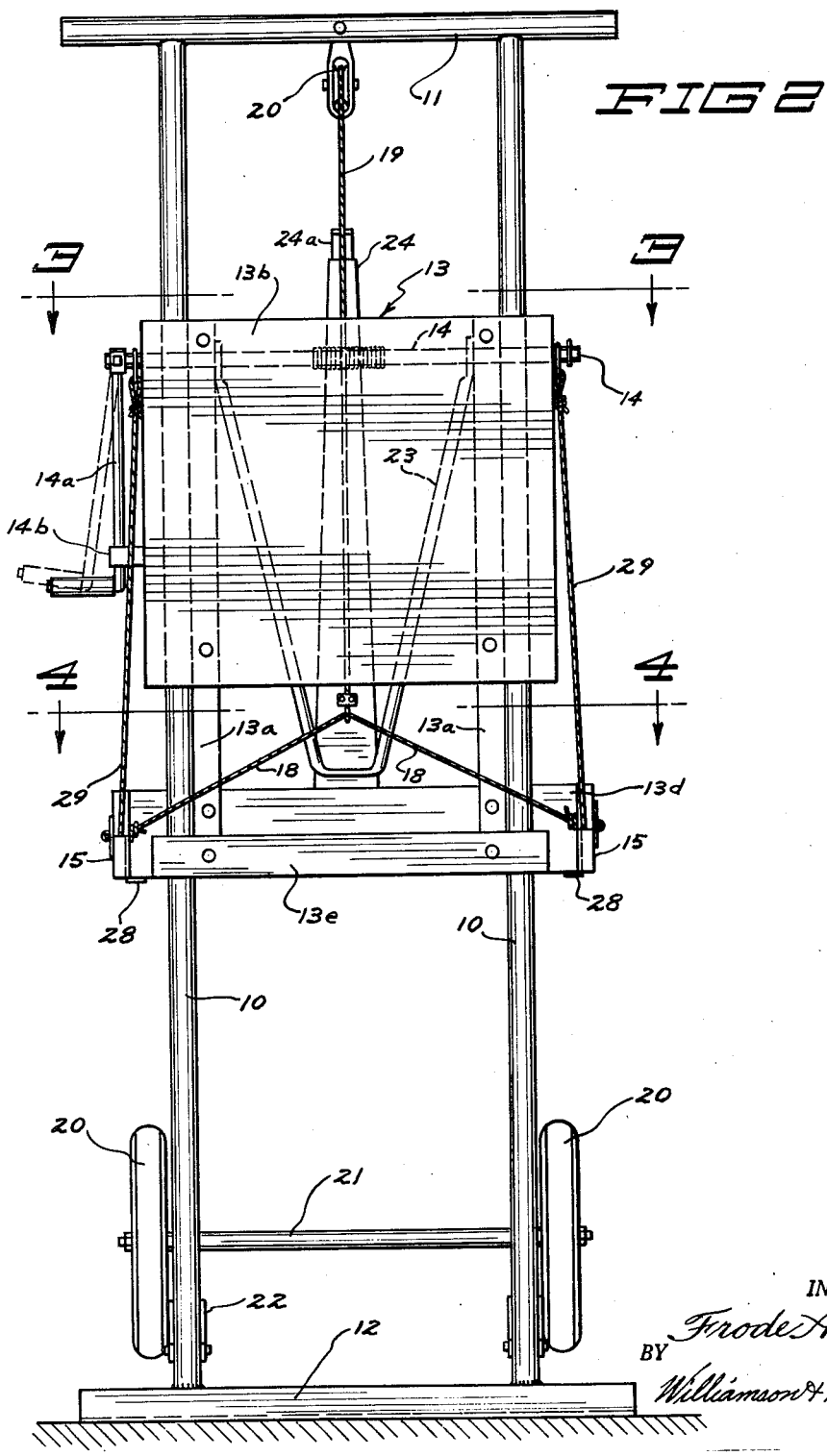

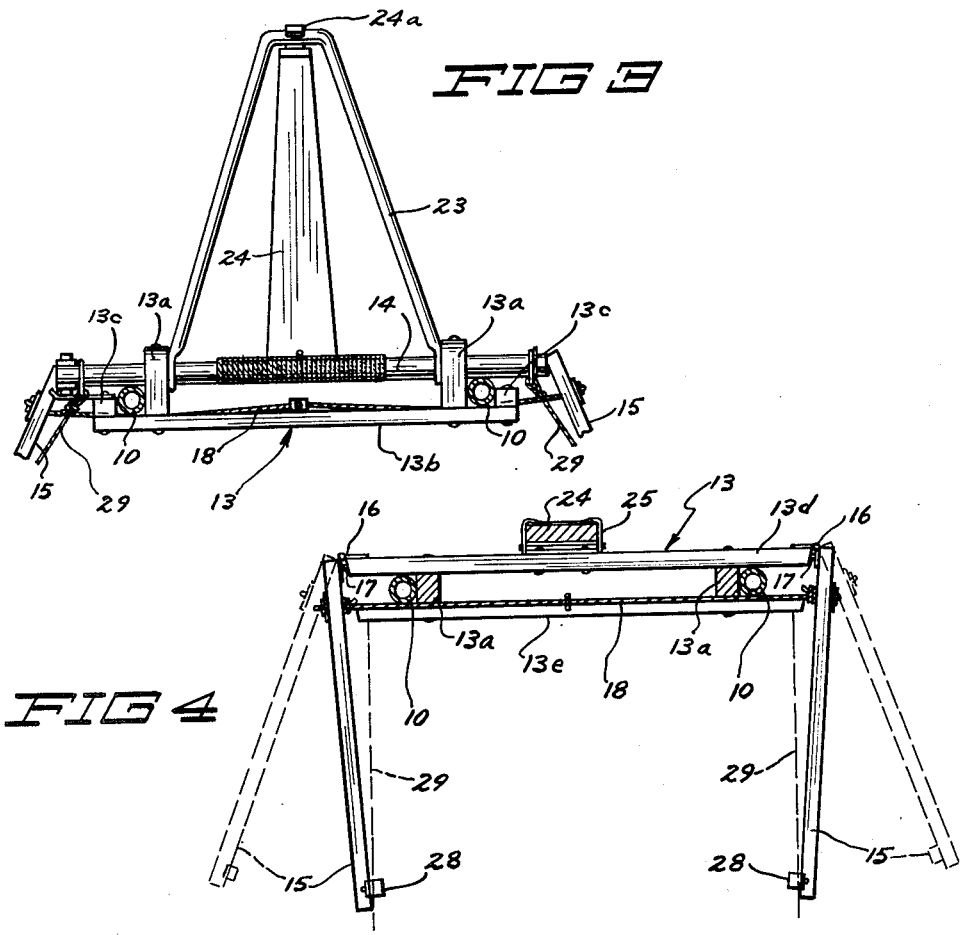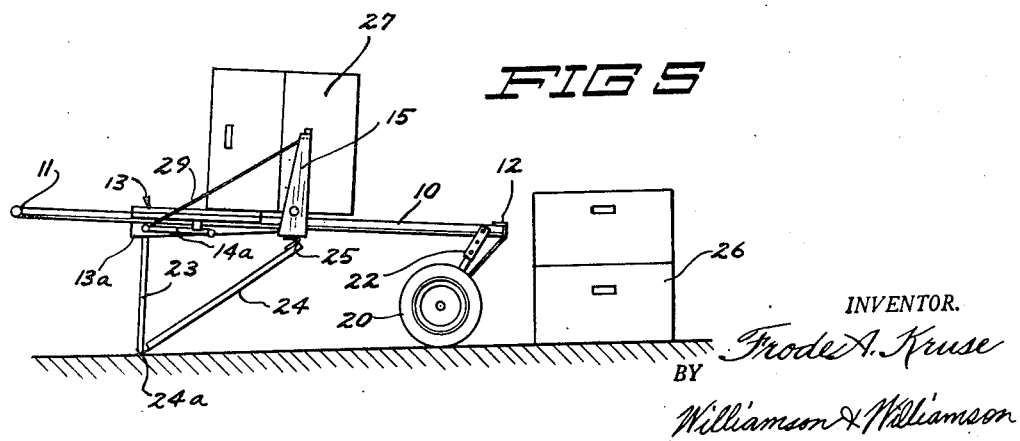

Patented May 18, 1954

2,678,744

UNITED STATES PATENT OFFICE 2,678,744

WHEELED LIFTER FOR BEEHIVE FRAME SECTIONS

Frode A. Kruse, Luck, Wis.

Application August 10, 1951, Serial No. 241,208

4 Claims. (Cl. 214—653)

This invention relates to beehive lifters.

In the care and keeping of bees it is often necessary to inspect the brood chamber of a hive to properly care for the same and thereby necessitate the removal of certain of the frames or supers. These upper frames or supers are often extremely heavy when filled with honey and it has in the past been difficult and hard work for the beekeeper to lift the upper supers from the lower frames particularly since it is very important to keep all of the upper honey-containing supers intact in interconnected sealed relationship produced by the bees when depositing their honey therein.

It is an object of my present invention to provide a novel and highly efficient lifter for beehive frames or supers which is adapted to tightly grip a selected super, lift the same along with the other supers stacked thereon from the lower frames, and then easily remove said supers from the lowers frames to permit inspection and care of the brood chamber and subsequently facilitate replacement of the removed supers.

It is another object to provide a combination beehive lifter and transporting carriage which greatly facilitates the handling of the hive sections or frames.

More specifically, it is an object to provide a lifter for hive sections adapted to be positioned to engage a selected super and tightly grip the same to permit said super along with the supers stacked thereon to be easily lifted from the base frames of the hive in which the brood chamber is located, said lifter being provided with wheels to facilitate transportation of the lifted and removed hive sections.

Still more specifically, it is an object to provide a lifter for selected stacked beehive sections or frames, said lifter having an upright supporting structure with a lower pickup fulcrum mounted at the bottom thereof and a pair of vertically shiftable pickup arms slidably mounted relative thereto and having means for positively adjusting the vertical position of said arms which may be controllably spread apart to receive a selected super therebetween and to be subsequently tightly clamped together to securely grip the engaged super and permit the elevating mechanism to lift said super along with the supers stacked thereon from the lower base frames, said lifter being provided with a rearwardly spaced tilting fulcrum and an intermediate depending support whereby the lifted supers may be laid down during the care of the brood chamber and then subsequently tilted back into upright position to replace the removed supers on the frame stack.

It is still a further object to provide a lifter for beehive sections to permit certain upper sections to be removed and materially elevated above the base section to facilitate insertion of an additional frame section between the base sections and the removed upper sections to provide additional space for the bees to deposit their honey.

These and other objects and advantages of my invention will more fully appear from the following description made in connection with the accompanying drawings wherein like reference characters refer to the same or similar parts throughout the several views and in which:

Fig. 2 is a front elevational view of my lifter in vertical position;

Fig. 3 is a horizontal sectional view taken substantially along the line 3—3 of Fig. 2;

Fig. 4 is another horizontal sectional view taken substantially along the line 4—4 of Fig. 2 and showing the pickup arms in open, spread position by dotted lines and in closed position by full lines; and Fig. 5 is a side elevational view of my lifter with a pair of removed supers supported thereon and shown in downwardly tilted position.

Figure 1:
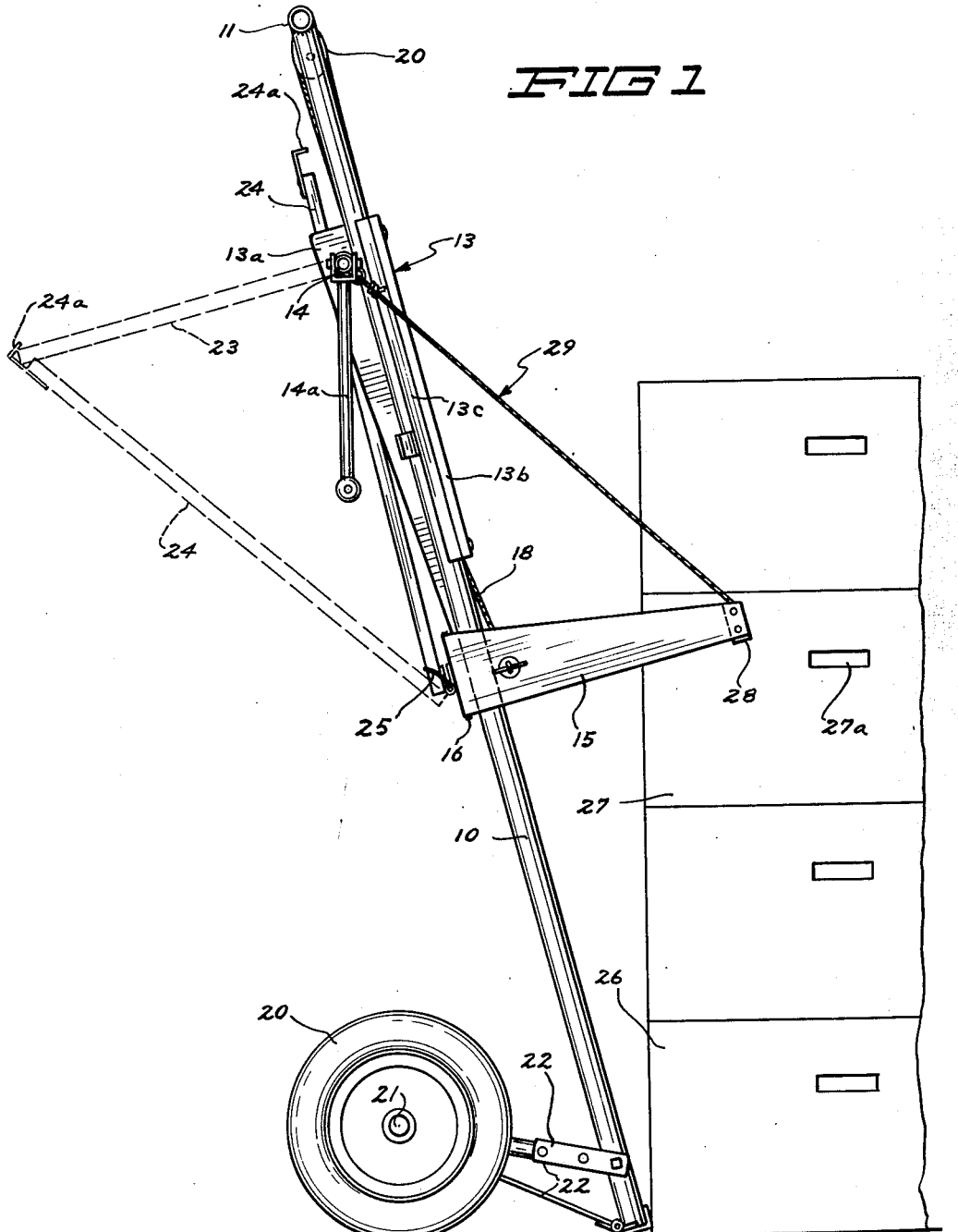
Fig. 1 is a side elevational view of my lifter in preliminary position preparatory to picking up selected supers; and showing the tilting rest in depending position by dotted lines.

As illustrated in the accompanying drawings, I provide a lifter for beehive frames having a supporting structure with a pair of upright frame members 10, an upper cross member 11 rigidly connecting the upper ends of said upright members 10 and providing a gripping handle at the upper end of the lifter. A pickup fulcrum 12 which in the form shown constitutes a transversely disposed angle iron, is securely fixed at the bottom ends of said upright frame members 10. A vertically slidable carriage, designated as an entirety by the numeral 13, is shiftably mounted on said two upright frame members 10, and a pair of guides 13a are provided for sliding engagement with the inner portions of said frame members. A super supporting plate 13b rigidly interconnects the upper front portions of said guides 13a and extends outwardly on the sides to overlie the upright frame members 10 and form upper front guides thereon. As best shown in Fig. 3, a pair of outer guide members 13c are fixed along the outer marginal edge portions of said supporting plate 13b and engage the outer side portions of said frame members 10. As best shown in Figs. 1 and 5, the inner guide members 13a are deeper at the top than at the bottom thereof and a transversely disposed elongated shaft 14 is journalled in the upper portions thereof and forms the rear retaining guide for the carriage 13. An arm supporting member 13d is transversely fixed across the lower end portions of the inner guide 13a on the back side of the uprights 10. The end portions of said arm mounting member 13d extend outwardly a short distance beyond the spaced uprights 10 and a pair of gripping arms 15 are hingedly mounted for swinging movement on vertical axes at the respective ends of said mounting member 13d, said hinges being designated by the numeral 16. The end portions of arm mounting member 13d are beveled, as best shown in Fig. 4, to permit said arms to swing freely inwardly, and a pair of resilient elements such as the coil spring 17 are respectively interposed between said beveled ends and opposed portions of said arms to normally urge said arms into open, super-receiving position. An elongated flexible member, such as the rope or cable 18, interconnects intermediate portions of said arms 15 and, in the form shown, is somewhat longer than the distance between the interconnected portions of said arms to permit the arms to be swung outwardly when the weight of the carriage is released from said flexible member 18.

A lifting or hoisting element, such as the rope or cable 19, is connected at its lower end to the medial portion of the flexible cross member 18 and passes upwardly therefrom around a sheave which is connected to an intermediate portion of the upper cross member or handle 11. The lifting member 19 passes downwardly from the sheave 20 and is connected at its other end to the winding shaft 14, around which the same is adapted to be wound, a crank 14a being pin-connected at one end of the shaft 13 to permit swinging movement thereof on an axis disposed transversely of the shaft. A crank-receiving stop member 14b is fixed to the side portion of carriage 13 and extends outwardly therefrom to receive the lower portion of the crank and hold the same against rotation. The crank 14a may be swung outwardly into the dotted position shown in Fig. 2 to rotate shaft 14. A lower front cross member 13e is rigidly connected across the lower portions of the guides 13a and extends outwardly a slight distance beyond the uprights 10.

A tilting fulcrum disposed in rearwardly spaced relation from the pickup fulcrum 12, in the form shown, consists in a pair of wheels 20 respectively journalled on a transversely disposed axle shaft 21. The wheels 20 are positioned so that the peripheries thereof are disposed rearwardly and at a higher elevation than the pickup fulcrum 12 to facilitate positioning of the lifter preliminary to the pickup operation and facilitate the tilting of the lifter back, as shown in Fig. 5. The axle shaft 21 has its end portions respectively carried by a pair of triangulated bracket frames 22. A retractable rest is provided to support the lifter when in rearwardly tilted position and consists in a pivotally mounted substantially U-shaped strut member 23 which is pivotally connected to the winding shaft 14 adjacent the guides 13a. A diagonal strut brace 24 has its lower end hingedly mounted on the arm supporting member 13d and extends upwardly therefrom. A wire spring 25 may be provided to normally hold said brace in upwardly swung position as shown by the full lines of Fig. 1. A strut-receiving cradle 24 is fixed at the end of brace 24 and receives the ground-engaging portion of the strut member 23.

The following is a description of the operation of my improved lifter for beehive frame sections and the like. The lifter is initially positioned, as shown in Fig. 1, with the pickup fulcrum 12 engaged against the ground and the lower hive frame section 26. The carriage 13 is adjusted to the desired elevation to position the arms 15 with the outer ends thereof adapted to be received in the hand-gripping openings 27a of a selected frame section 27. A pair of opposed gripping flanges are respectively mounted at the end portions of arms 15 and are designated by the numeral 28. A pair of diagonal bracing members, such as the flexible rope or cable tension members 29, interconnect the outer end portions of the arms 15 with portions of the carriage 13 disposed thereabove as by being hooked onto the outwardly extending portions of winding shaft 14. Since the sole support for the entire lifting carriage 13 is the flexible member 19 connected at its lower end to the flexible tying member 18, said tying member 18 normally carries the entire load of the carriage, but as soon as the weight of the carriage is released therefrom, as by lifting the same manually, then the resilient elements 17 will urge the arms 15 in super-receiving position, as shown by the dotted lines of Fig. 4, and the only limitation on the amount of outward swinging movement produced on the arms 15 by springs 17 is the length of flexible tying member 18. When the elevation of the arms 15 has been properly adjusted to position the gripping flanges 28 at the proper elevation to be received in the hand openings 27a of the selected super 27, the entire lifter structure is tilted forwardly about the pickup fulcrum member 12 to position said flanges 28 adjacent the openings 27a and when so positioned the carriage 13 is released and elevated slightly to swing the arms inwardly by applying tension on the tying member 18 to positively engage said flanges 28 in the respective openings 27a on each side of the selected super 27.

The super 27 along with the other supers stacked thereon is lifted by turning the crank 14a to wind the flexible member 19 on shaft 14. The entire weight of the supers being carried by the tying member 18 which supports the entire carriage structure and tightly holds the flanges in the hand openings 27a of super 27. Obviously, the supers may be lifted to any desired elevation to permit additional supers or hive frame sections to be interposed into the stack below the lifted supers. Also, the lifted supers may be tilted back away from the stack to expose the brood chamber for inspection and care and then may be easily replaced after completion of the work on the brood chamber. As the engaged supers are lifted and tilted rearwardly, the wheels 20 of course serve as a tilting fulcrum about which the entire lifter pivots and the supporting strut 23 engages the ground surface and provides a rest to support the weight of the supers when the lifter is tilted back into extreme position. Obviously, the wheels also serve to facilitate transportation of the engaged supers and my lifter greatly aids in the collection of the honey-filled supers at harvest time. The crank handle 14a is of course normally held against rotation by the stop member 14b, but may be easily swung outwardly to permit rotation thereof for winding or unwinding the flexible elevating member 19.

It will be seen that I have provided a novel and highly efficient lifter for beehive frames or supers which greatly facilitates handling of the relatively heavy upper frame sections in caring for the brood chamber, and in performing the other necessary duties on the stack of hive supers. My improved lifter provides a pickup fulcrum at the lower end thereof which provides a positive pivot point about which the entire frame structure may be swung to easily position the gripping flanges 28 on the arms 15 within the openings 27a and also provides a tilting fulcrum disposed in rearwardly and upwardly spaced relation to said pickup fulcrum about which the entire frame structure with the supers carried thereby may be tilted back and supported in rearwardly tilted position on the braced retractable structure 23.

The lifting mechanism not only serves to elevate the carriage to the desired elevation but also securely holds the clamping arms in gripping engagement with the selected super. The wheels of course permit easy transportation of the lifter whether loaded or unloaded.

It will, course, be understood that various changes may be made in the form, details, arrangement and proportions of the parts without departing from the scope of my invention.

What I claim is:

1. A lifter for beehive frame sections and the like comprising an upstanding supporting structure, a vertically shiftable carriage slidably mounted on said supporting structure, a pair of gripping arms having their rear ends respectively hinged for substantially horizontal swinging movement on a pair of spaced upstanding axes, means for normally urging said arms into spread relationship to receive an article therebetween, a flexible tying member interconnecting intermediate portions of said arms, an elevating and supporting member connected to said interconnection member at an intermediate portion thereof and mechanism for shifting said elevating and supporting member upwardly and downwardly to move said carriage on said structure and forming the sole means for supporting the weight carried by said carriage, the weight of said carriage normally urging said arms into contracted relation and releasing of said weight permitting said arms to swing outwardly into spread relation.

2. A lifter for beehive frame sections and the like comprising a wheeled supporting structure, a pair of outstanding transversely spaced gripping arms hingedly mounted at their rear ends on said structure for swinging movement on a pair of substantially upstanding axes, yieldable means normally urging said arms into spread-apart relation, a flexible tying member interconnecting intermediate portions of said arms, gripping elements formed at the forward ends of said arms for engagement with said beehive frames, and tensioning means connected with an intermediate portion of said tying member to positively hold said arms in frame-engaging position when a load is applied to said gripping elements, but permitting said arms to spring into spread-apart releasing position when no load is applied thereto.

3. A lifter for beehive frames and the like comprising a wheeled supporting structure, a pair of elongated, forwardly extending gripping arms hingedly mounted at their rear ends on said structure for free swinging movement on a pair of substantially upstanding axes, a flexible tying member interconnecting intermediate portions of said arms to permit free swinging movement thereof of said arms when no load is applied thereto to facilitate adjustment of the arm positions relative to the beehive frames to be lifted, and tensioning means connected with said tying member to positively retain said arms in contracted gripping position when a load is being lifted thereby, but permitting said arms to be swung into spread-apart relation when no load is applied thereto.

4. A lifter for beehive frame sections and the like comprising an upstanding supporting structure, a vertically shiftable carriage slidably mounted on said supporting structure, a pair of forwardly extending spaced gripping arms having their rear end respectively hinged for substantially horizontal swinging movement on a pair of spaced, generally upstanding axes, a flexible tying member interconnecting intermediate portions of said arms, and adjustable tensioning means connected to said flexible tying member to permit said arms to be freely swung on their respective axes when no load is applied thereto, but forming the sole means for supporting the load engaged by said arms to positively hold the same in contracted load-engaging position.

References Cited in the file of this patent

UNITED STATES PATENTS

| Number | Name | Date |
|---|---|---|
| 228,967 | Woods | June 15, 1880 |
| 1,255,070 | Waller | Jan. 29, 1918 |
| 1,449,011 | Littlefield | Mar. 20, 1923 |
| 1,551,928 | Bryan | Sept. 1, 1925 |
| 1,591,766 | Mayer | July 6, 1926 |
| 1,617,644 | Littlefield | Feb. 15, 1927 |
| 1,971,952 | Townsend | Aug. 28, 1934 |
| 2,108,480 | Foster | Feb. 15, 1938 |
| 2,514,825 | Zenko | July 11, 1950 |
| 2,533,352 | Chapman et al. | Dec. 12, 1950 |
| 2,598,489 | Bayer et al. | May 27, 1952 |